Aug. 29, 1961     R. F. GERISCH     2,998,136
COMBINATION CONVEYING AND SORTING APPARATUS
Filed Dec. 4, 1956     5 Sheets-Sheet 1

INVENTOR.
Rudolph F. Gerisch,
BY
Atty's.

United States Patent Office 2,998,136
Patented Aug. 29, 1961

2,998,136
COMBINATION CONVEYING AND
SORTING APPARATUS
Rudolph F. Gerisch, 1317 Portsmouth Ave.,
Westchester, Ill.
Filed Dec. 4, 1956, Ser. No. 626,260
36 Claims. (Cl. 209—122)

This invention relates to improvements in apparatus for conveying and sorting articles, particularly articles adapted to be suspended by hooks or the like.

In dry cleaning plants it is customary to convey garments on hangers from one location in the plant to another, and numerous automatic conveyor schemes have been devised for this purpose. Similarly, in laundry establishments is is frequently necessary to convey bags of presorted laundry through various stages in the plant. However, in addition to transporting such articles from one location to another it is also desirable in many cases to have some convenient sorting arrangement so the articles can be transported and assembled in sorted groups at different locations. My invention utilizes a novel principle in apparatus of this general character which makes it possible to convey articles in any desired sorted relation between a common loading point and any number of delivery points while maintaining the predetermined sorted relation of the articles at all times so that there is no possibility of error. Although the invention has particular utility in the dry cleaning and laundry fields, the principles may be employed in a wide variety of industrial conveying and sorting operations.

Accordingly, a primary object of the invention is to provide a novel and improved apparatus for conveying articles in predetermined sorted relation.

A further object of the invention is to provide a novel and improved apparatus of the foregoing character which is especially adapted to handle articles suspended from hooks or the like.

Another object of the invention is to provide novel and improved apparatus of the foregoing character in which the articles are positively maintained in predetermined sorted relation at all times during passage from a common loading point to any desired number of delivery points thereby eliminating any chance of error once the articles have been loaded.

An additional object of the invention is to provide a novel and improved conveyor-sorting system which is comparatively simple, compact, and inexpensive but which at the same time offers wide flexibility of application and can conveniently accommodate the sorting of articles into a large number of groups.

Other objects and advantages of the invention will become apparent from the subsequent detailed description taken in conjunction with the accompanying drawings, wherein.

Figure 1:
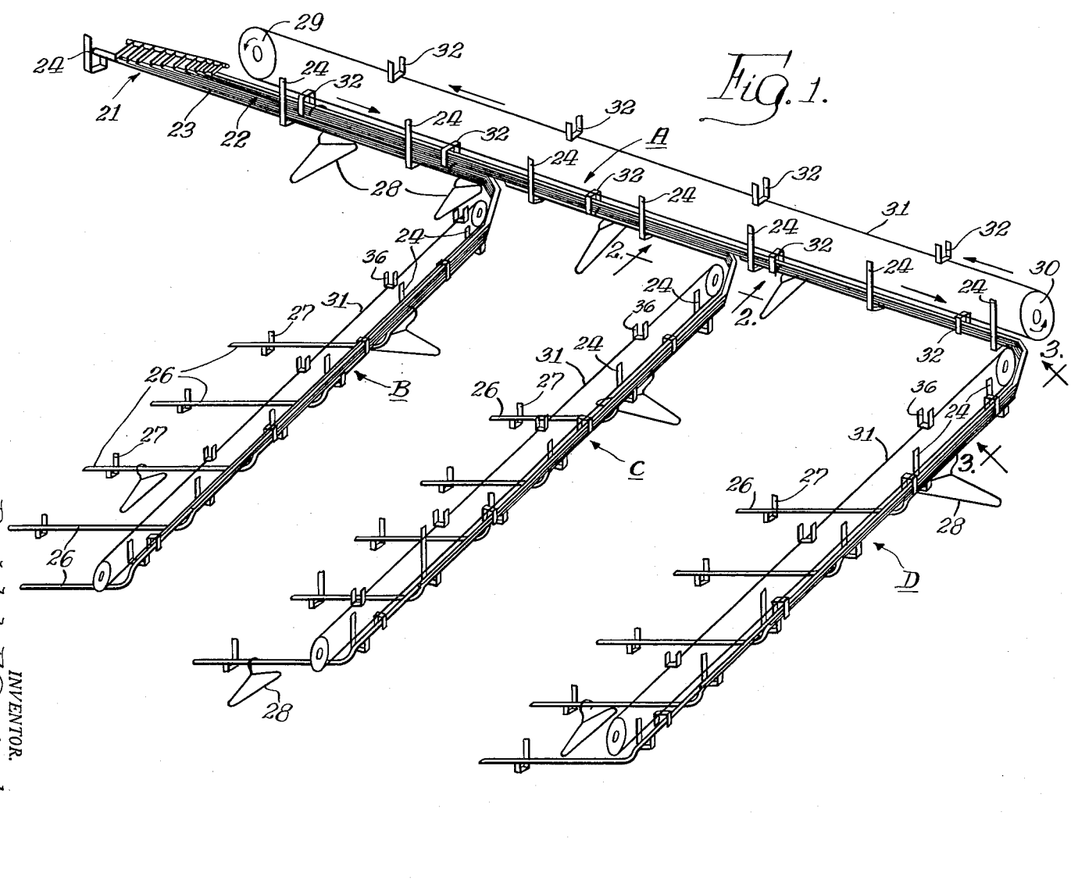
FIG. 1 is a partially schematic perspective view of a combined conveying and sorting system comprising one specific embodiment of the invention.

Referring first to FIG. 1, the invention is herein specifically illustrated in connection with a conveying-sorting system of a type which might be used in a dry cleaning plant. However, as heretofore mentioned, it is to be understood that the principles of the invention will find wide application in many diverse industrial fields. Broadly speaking, the system shown in FIG. 1 comprises a loading station, indicated schematically at 21 and hereinafter described in more detail, from which extend a plurality of elongated relatively thin strips extending in superimposed or vertically stacked relation. The stack of strips extending from the loading station 21 is indicated generally at 22. As will become apparent from a consideration of subsequent detailed views, the strips 22 are supported in this case on an elongated bar or rail 23 which is suspended from superstructure (not shown) by means of a plurality of brackets or hangers 24 located at suitable points along the system. The rail 23 has a main run or longitudinal portion designated for convenience as "A" with a plurality of laterally extending branch portions "B," "C" and "D," each of the branches having certain sub-groups of the stacked strips 22 extending therealong. Thus, as seen in FIG. 1, at the juncture of the branch "B" with the main run "A" a group of strips at the bottom of the stack 22 follow the branch portion "B" while the remaining strips of the stack continue along the main run "A" to the juncture with the branch "C" at which point another group of strips at the bottom of the stack diverges from the main run and follows the branch portion "C" of the rail 23. Finally, the remaining strips constituting the continuation of the main run "A" follow the final lateral branch "D." As will also appear hereinafter in more detail, the sub-group of strips comprising each of the branch lines "B," "C" and "D" terminate at successive intervals in a plurality of delivery stations each comprising a drop-off or take-off bar 26 supported by brackets 27. Although the system shown in FIG. 1 by way of example comprises a main run with three laterally extending parallel branches and with each branch having five laterally extending delivery stations, it will be understood that the system may have any desired configuration with any number of separate branches and delivery stations to conform to the requirements of a given installation.

As herein illustrated in connection with a conveying-sorting system for garments, the stacked strips 22 are adapted to have interposed between adjacent strips the hook portions of a plurality of conventional wire clothes hangers 28 upon which garments may be suspended in the usual manner for transportation from the loading station 21 to the various delivery stations at the bars 26. For the sake of convenience, the garment hangers 28 will hereinafter be referred to merely as hooks since from a broad point of view the exact nature of the articles suspended from the hooks is immaterial. Obviously, in order to accommodate insertion of the hooks 28 between adjacent strips in the stack 22, the strips must have a certain degree of flexibility to permit temporary or local deflection or spreading apart of adjacent strips during insertion and sliding passage of the hooks therebetween.

For effecting movement of the hooks 28 from the loading station 21 to the various delivery stations, suitable endless conveyor devices of a well known type are utilized, such conveyor means being shown herein largely in schematic fashion because the details thereof are not pertinent to the present invention. Thus, in FIG. 1 an elongated conveyor means comprising a pair of sprockets or pulleys 29 and 30 with an endless chain or belt 31 trained therearound is mounted above the main run "A" of the system. The belt 31 moves in the direction indicated by the arrows in FIG. 1 and carries a plurality of bifurcated members or U-shaped forks shown schematically at 32. As the forks 32 are carried around the sprocket 29 adjacent the loading station 21, the spaced leg portions of each fork are brought into straddled relation with the stacked strips 22 and each fork 32 is thereby moved into position to engage a hook 28 previously inserted between selected adjacent strips at the loading station 21 and shifted into position to be contacted by one of the moving forks 32. As the fork 32 engages the hook 28 it slides the latter along the stack of strips until the hook arrives at one of the branches "B," "C" or "D" dependent upon the location of the hook in the stack 22. Each of the branch lines "B," "C" and "D" is likewise provided with a similar moving conveyor arrangement designed to transport the individual hooks 28 along the branch lines to the respective delivery stations at the drop-off bars 26, the operation of the several conveyors and the coaction with the hooks 28 being the same as heretofore described in connection with the main run "A."

Figures 2, 3:
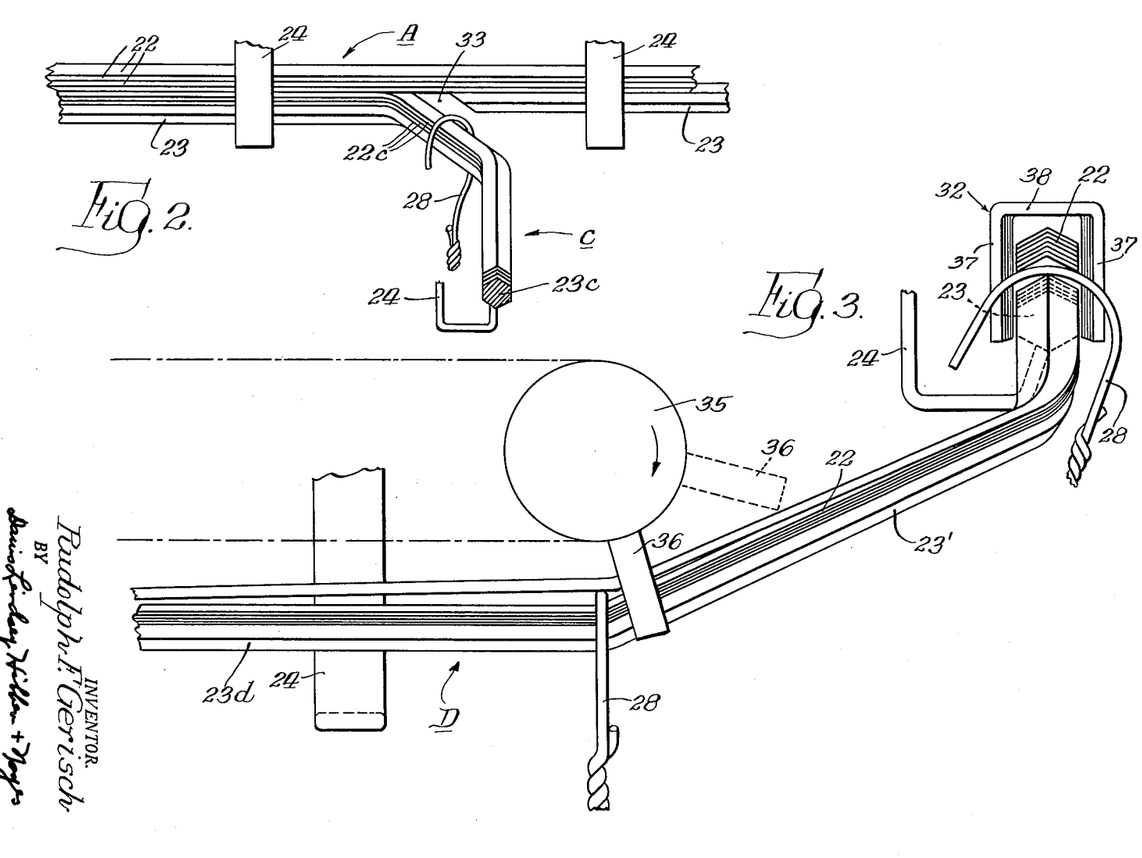
FIG. 2 is a fragmentary elevational view on an enlarged scale of one portion of the apparatus substantially as seen along the line 2—2 of FIG. 1.
FIG. 3 is a fragmentary elevational view on an enlarged scale showing another portion of the apparatus substantially as seen along the line 3—3 in FIG. 1.

Referring now to FIGS. 2 and 3, the nature of the connection between the main run "A" and the respective branches "B," "C" and "D" will be explained. As seen herein, the support rail 23 comprises in this instance a rod or bar of hexagonal cross-section and the strips 22 are formed with a complementary inverted V-shaped cross-section so as to conform closely to the shape of the rail 23 and also to interfit closely with each other so as to facilitate compact stacking of the strips. Although the support rail 23 and the strips 22 may be flat, if desired, it is preferred that the strips be generally bulged or arched in transverse contour so as to provide a generally concave-convex relationship at opposite sides of adjacent strips whereby to obtain the benefit of a certain degree of self-alignment which automatically occurs between nested strips of the aforementioned shape.

As seen in FIG. 2, the main support rail 23 branches downwardly and angularly outwardly to provide a branch support rail portion 23c for the branch line "C" which extends horizontally at a level somewhat below the level of the main run "A." Likewise, a lowermost sub-group 22c of the strips 22 follow and extend along the branch rail portion 23c. However, the main support rail 23 continues along the main run "A" as seen at the right-hand side of FIG. 2 with the remaining strips 22 bridging a gap or opening 33 at the juncture of the main run "A" with the branch "C." This gap 33 is wide enough to provide the necessary clearance to permit the hooks 28 to twist and slide by gravity along the angularly inclined connecting portion between the main run "A" and the branch "C." Thus, as the hooks 28 are moved along the main run "A" by the pusher forks 32, the particular hooks which are supported on or associated with the sub-group of strips 22c terminating in the branch "C" will automatically drop from the main run "A" and slide by gravity down the inclined connection to the horizontal portion of the branch "C," the gap 33 being sufficiently large to accommodate this drop-off and diverging travel of the hooks 28. It will be understood that at the time of drop-off the pusher fork 32 is disengaged from the hook 28 which follows the branch line and the fork is thereafter carried along the continuation of the main run "A" in an obvious manner.

By means of the strips 22 which bridge over the gap 33 and are supported by the continuation of the main support rail 23, positive support is provided for all hooks 28 which are interposed between and being pushed along the uppermost group of strips 22, i.e. above the sub-group 22c which follow the branch "C." At the same time it will be seen that the angular inclination of the drop-off connection between the main run "A" and the respective branch lines is such that the hooks 28 which are pushed along the main run "A" beyond a branch juncture have adequate clearance for continued straight line movement thereof along the main run. This will be particularly evident from FIG. 3 wherein the main run portion of the support rail 23 and a hook 28 thereover are shown in relation to the angularly inclined connecting portion, desginated at 23', and the branch line portion of the support rail designated at 23d.

FIG. 3 also indicates in schematic fashion the manner in which the cooperating conveyors for the branch lines pick up the hooks 28 following their gravity travel between the main run and a branch line. Thus, a branch line conveyor sprocket or pulley is designated at 35 with a pusher fork 36 being shown in broken lines as it approaches the stacked strips 22 and shown in solid lines after the fork has straddled the stacked strips and support rail and is just about to be moved into engagement with a hook 28 for sliding the same along the branch line "D." In this manner the hooks 28 are transported along the branch lines "B," "C," and "D" to the various delivery stations by the positive action of the conveyor-driven pusher forks after the hooks have moved by gravity over the angularly inclined connecting sections of the system.

In addition to the pusher function of the bifurcated conveyor-driven members, such as the forks 32 and 36, these generally U-shaped members also serve another very important function in the system, namely, the maintenance of the superimposed strips 22 in properly stacked alignment on the support rail 23. As will be apparent, the invention contemplates extended lengths of relatively bendable or flexible strip material having no connections or fastenings except at their terminal end portions which may be spaced at considerable distances from each other. Moreover, the invention also contemplates that a large number of strips 22 may be superimposed upon each other in order to provide a number of independent trackways corresponding to different groups into which the articles involved are to be sorted. Accordingly, it becomes of the utmost importance to provide a suitable guide means for retaining the strips in stacked alignment intermediate their opposite ends. In the present embodiment of the invention, this function is performed at spaced intervals along the length of the main run and along the respective branches by the action of the fork members 32. As seen in FIG. 3, the fork member 32 comprises in this instance a U-shaped element having a pair of spaced depending leg portion 37 and an interconnecting portion 38. The U-shaped member is disposed in straddled relation over the stack of strips 22 and the support rail 23 with the legs 37 being long enough to accommodate the height and size of the stack involved and being disposed at opposite sides thereof in relatively close-fitting relation so as to prevent any appreciable degree of misalignment in the stacked strips 22. However, inasmuch as the fork members of the respective conveyors are constantly being moved into straddling relation with the stacked strips and are then being disengaged from the strips in a repeated cyclic manner, it will be appreciated that the positioning of the forks relative to the strips and underlying rail and the clearance therebetween must be controlled rather carefully in order to maintain proper operation of the system. In order to alleviate this problem to some extent, I prefer that the spaced leg portions 37 of the forks be disposed at an angle and in oppositely inclined relation as seen in FIG. 3 whereby the distance between the edge portions of the legs 37 at one side of the fork is somewhat greater than the distance between the edge portions of the legs 37 at the opposite side of the fork. In other words, the angular orientation of the legs 37 relative to the axis of the stacked strips 22 provides a tapering throat or passageway through each of the forks, and the forks are so arranged that the enlarged throat portion or wide opening of each fork is located at the leading side of the fork, i.e. the side of the fork which first moves into straddled relation over the stacked strips, and the restricted throat portion or the narrow opening of the fork is located at the trailing side of the fork. In this manner it will readily be understood that as each fork is moved into straddling relation over the stack of strips the wide opening of the fork embraces the stack first thereby increasing the available clearance at this critical point and at the same time accommodating a greater degree of permissible misalignment of the strips 22 without obstructing movement of the fork into straddled relation. As the fork completes its movement into straddled relation over the stacked strips, the restricted opening at the trailing or narrow side of the fork together with the converging configuration of the legs 37 provides a lateral or sidewise camming action which effectively forces the strips into alignment and positively prevents any detrimental degree of misalignment. Moreover, the forks may also be mounted so as to have a slight amount of lateral play or shiftability relative to the fork-supporting structure, such as the belt or chain in the case of conveyor-mounted forks. In this way the camming effect due to the angularly disposed fork legs also serves to correct any slight misalignment between the forks and the rail with its stacked strips. By reason of the spacing of the forks at frequent intervals along the conveyor means in order to effect pushing of a large number of hooks at any one time, it will be seen that the supplementary guiding and aligning function of the forks on the strips is also provided at a plurality of spaced intervals along the length of the strips.

Figures 4, 5, 6, 7, 12:
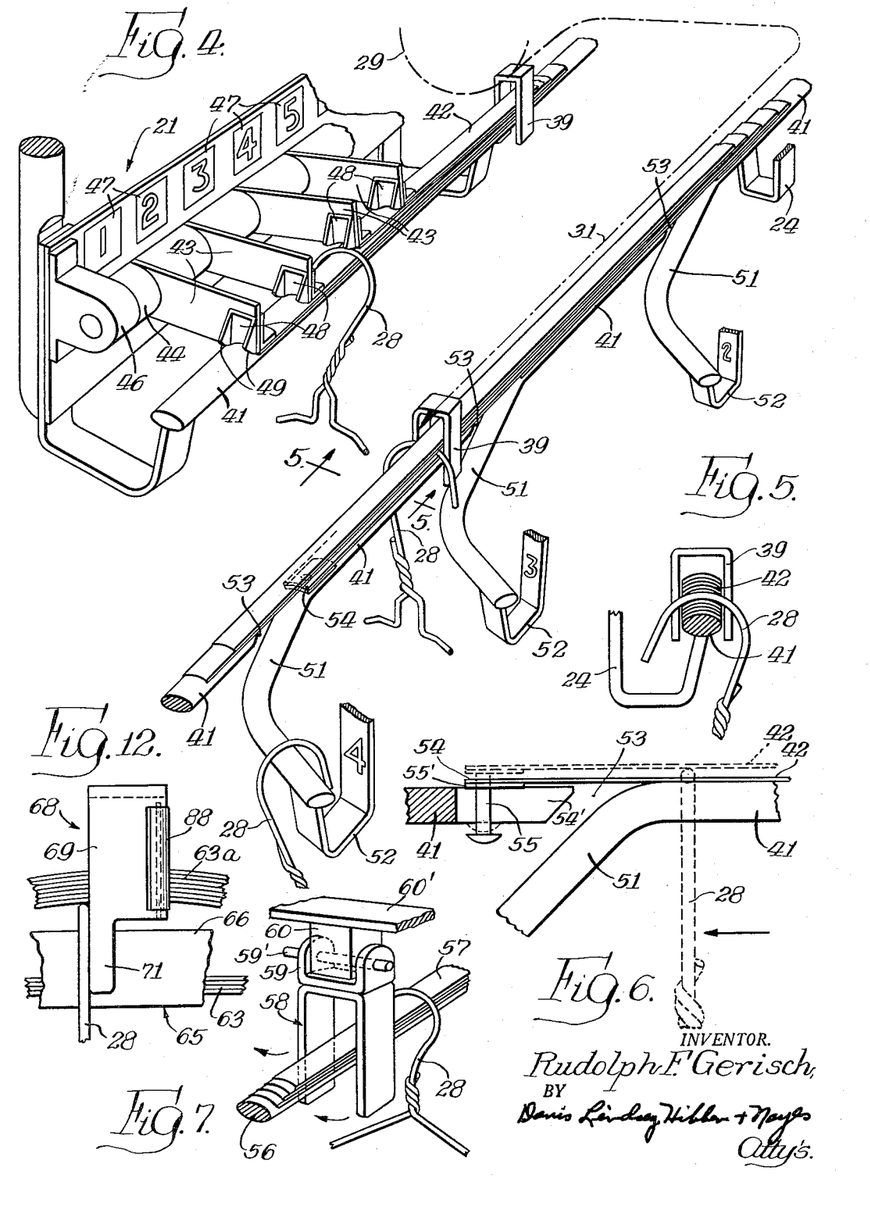
FIG. 4 is an enlarged fragmentary perspective view showing additional details of the apparatus with slight modifications.
FIG. 5 is a fragmentary transverse sectional view substantially as seen along the line 5—5 of FIG. 4.
FIG. 6 is a fragmentary view showing a structural detail of the apparatus.
FIG. 7 is a perspective view of a modified form of one element of the apparatus.
FIGS. 12 to 17 are fragmentary detailed views illustrating additional modifications of certain elements of the apparatus.

Referring now to FIGS. 4 and 5, the details of the loading station 21 and the delivery stations will now be described in connection with a somewhat simplified but generally similar version of the system heretofore discussed. In FIG. 4 the conveyor system is designated merely schematically by broken lines and the conveyor pusher forks are in this instance simple U-shaped members 39 having parallel spaced leg portions rather than the angularly slanted leg portions heretofore described. Moreover, the elongated support rail is in this instance a bar 41 of generally oval cross-section with the superimposed strips designated at 42 likewise having a similarly curved cross-sectional contour to conform to the bar 41.

As shown in FIG. 4, the loading station 21 comprises a plurality of sorting arms 43 arranged in substantially parallel but transversely spaced relation along the length of the support bar 41. Each arm 43 is mounted for swinging movement at one end thereof about a pivot shaft 44 supported between a pair of brackets one of which is shown at 46. The opposite or outer end of each arm 43 has rigidly fastened thereto a terminal end portion of one of the individual strips 42, the terminal end portions of the strips being thereby staggered longitudinally of the bar 41 corresponding to the spaced relation of the arms 43 therealong. The spaces between the arms 43 provide multiple entryways between pairs of adjacent strips 42 for admitting a hook 28 in interposed relation therebetween. Also, as seen in FIG. 4, the entryways between the sorting arms 43 are identified by suitable indicia such as the numerals 47.

In the use of the system, an operator of the loading station (in the case of a manual loading operation) places the hooks 28 one at a time over the support bar 41 and the accompanying superimposed strips 42 in any selected one of the entryways corresponding to the particular group to which the hook and its accompanying article are assigned by the operator. Thus, the hook 28 for an article to be conveyed as a part of group "1" would be loaded at the entryway identified by the numeral "1" at the left-hand end of the loading station, a group "2" article would be loaded by placing the hooks 28 in the space "2" between the first and second sorting arms, etc. After the hook is placed in the appropriate entryway by the operator, the hook 28 is then slid to the right beyond the loading station to a position where the hook will be engaged by a pusher fork 39 as shown at the right-hand end of the loading station in FIG. 4. In other words, each individual hook 28 must be loaded into a selected entryway, either manually or by machine, and then slid between the selected strips 42 to a point where the conveyor mechanism with its pusher forks can make contact. Thereafter, the transportation of the hook is entirely automatic until the selected delivery station is reached.

In order to facilitate lengthwise sliding of the hooks 28 from an entryway to the point at which the forks are effective, the outer end of each sorting arm 43 is preferably provided with cam means comprising in this instance an element 48 having edge portions 49 disposed at an angle to the axis of the support rail 41 so as to provide a wedge-shaped space therebetween. Referring to the entryway for group "3" in FIG. 4, as the operator moves the hook 28 to the right into the wedge-shaped space between the cam edges 49 of the adjacent arm 43 and the underlying strip 42, the hook 28 automatically forces the arm upwardly relative to the pivot shaft 44 thereby lifting the terminal end portion of the strip 42 so as to expedite sliding of the hook 28 in between the strip 42 underlying the hook and the strip 42 immediately thereover. As will be apparent from FIG. 4, the lifting of any one arm 42 automatically causes lifting of all succeeding arms to the right because of the superimposed relation of the strips and the rigid fastening of the terminal portions of the strips to the respective arms.

Obviously, the loading station 21 may comprise any desired number of sorting arms 43 corresponding to the number of strips 42 and the number of sorted groups required in connection with the operation of the system. As heretofore mentioned, the strips 42 may be relatively thin metal or other suitable material so that a large number of strips can be superimposed within the limits of practicality. Of course, the structural strength of the strips must be sufficient to withstand the weight of the articles suspended thereon as well as the frictional wear and abrasion caused by repeated sliding of the hooks along the strips. At the same time, the strips must be sufficiently flexible or deflectable to permit localized spreading apart of adjacent strips so as to accommodate the sliding passage of the hooks therebetween.

In the lower portion of FIG. 4 there is shown a section of the system located remotely from the loading station 21 and including a plurality of delivery stations adapted to receive the articles in sorted groups. At this section of the system the support bar 41 has a plurality of downwardly and outwardly extending take-off branches 51, each having connected thereto an opposite terminal end portion of one of the strips 42. These discharge or delivery branches 51 are supported by suitable brackets 52 which in this case carry identifying numerals corresponding to the numerals 47 of the entryways 43 at the loading station 21. For example, the strip 42 which has one of its terminal end portions secured to the sorting arm at the right of entryway "2" at the loading station 21 is connected at its opposite terminal end portion to the take-off branch 51 identified by the numeral "2." Similarly, each of the strips 42 extends continuously between one of the sorting arms 43 at the loading station 21 and a corresponding take-off branch 51 at one of the delivery stations located remotely from the loading station. Each diverging branch 51 is separated by a gap or space 53 from the straight run continuation of the support rail 41, and these gaps 53 are in turn bridged across by the overlying continuing strip elements 42 in the same general manner heretofore described in connection with FIG. 2. Likewise, the angular configuration and inclination of each take-off branch 51 is such as to permit discharge or drop-off of the desired hooks 28 while at the same time providing adequate clearance for continued movement of other hooks 28 beyond the drop-off point. As shown in FIG. 4, a hook 28 is in the process of being pushed by a fork 39 and has just cleared the take-off branch 51 for delivery station "3." As this particular hook 28 continues in its travel it will be seen that the immediately underlying strip 42 terminates, as indicated at 54, at the branch juncture for delivery station "4" so that the hook 28 will necessarily be pushed beyond the end 54 of the strip and will thereafter slide by gravity along the inclined portion of the take-off branch and will come to rest at delivery station "4." Similarly, other hooks 28 will be delivered to various other delivery stations and the articles will accumulate at the delivery stations in predetermined sorted groups.

As mentioned above in connection with the description of the loading station 21, each of the strips 42 has one of its terminal or end portions securely fastened to one of the liftable arms 43. In FIG. 6, I have shown the details of a preferred scheme for connecting the opposite terminal portion of each strip 42 to an appropriate portion of the support rail 41. In this instance, a hook 28 is shown moving to the left along a lowermost strip 42 supported directly on the support rail 41 and approaching a take-off or delivery branch 51 with a gap 53 existing between the take-off and the left-hand continuation of the support rail 41. In this particular case, the hook 28 is destined for delivery at the next subsequent take-off branch 51 (not shown) and, therefore, the strip 42 is shown bridging the gap 53. However, in order for this particular hook 28 to be discharged onto the next subsequent take-off branch, it is necessary that the strip 42 terminate before the next take-off branch, and obviously such termination of the strip could occur at any point between the gap 53 and the next subsequent take-off branch. For example, in FIG. 4 the termination of the lowermost strip at 54 is just prior to the beginning of the diverging take-off branch 51 for delivery station "4." However, for convenience, the termination point shown in FIG. 6 is immediately adjacent the downstream side of the gap 53.

The connection shown in FIG. 6 is in the nature of a loose expansible connection which permits limited longitudinal shifting movement of the strip end 54 relative to the underlying portion of the support rail 41. In this instance, the loose connection is provided by means of an endwise slot 54' in the continuation of the main support rail 41 with a rivet or headed fastener pin 55 extending upwardly through the slot 54' and permanently secured to the terminal portion 54 of the strip 42. A reinforcing plate or element 55' is secured to the end portion 54 of the strip 42 so as to provide a somewhat greater thickness or body of material to which the upper end of the pin 55 may be fastened. As will readily be understood, the pin 55 has a sliding fit in the slot 54' and can move longitudinally in the slot and also vertically to a limited degree. As indicated in broken lines in FIG. 6, the limited vertical movement of the pin 55 permits the strip 42 to be lifted slightly in the event that a hook 28 passes along the support rail 41 beneath the strip 42 and such vertical liftability of the end portion of the strip thereby facilitates discharge and delivery of a hook onto the take-off branch 51. Moreover, the limited longitudinal movability of the strip end 54 by reason of the loose pin and slot connection allows the strip 42 to accommodate local distortion or lifting caused by a passing hook and also compensates for expansion or contraction due to ambient temperature effects. The retention of the strip end on the support rail by a connection such as shown in FIG. 6 which permits limited movement of the strip end also accommodates any permanent stretching of the strip which may occur after a considerable period of use of the system and also facilitates replacement of the strips during maintenance and repair of the system.

Although the pin and slot arrangement or other equivalent connection providing limited movability of the strip end is by far the preferred arrangement for the reasons just mentioned, it is possible in certain instances to employ a rigid fastening of the strip end to the support rail 41. However, in such case it is necessary that the rigid connection be spaced a substantial distance from the nearest preceding take-off or delivery branch so that the closest point of lifting or localized deflection of the strip due to passage of a hook will be somewhat remote from the rigid connection of the strip end to the rail.

By reason of the arrangement just described it will be seen that each pair of adjacent superimposed strips 42 defines in effect a trackway or passageway for sliding of hooks therebetween. Furthermore, each such trackway is completely segregated from the other adjacent trackways because of the fact that each strip 42 extends continuously and uninterruptedly between a sorting arm at the loading station 21 and a corresponding take-off bar 51 at a delivery station remote from the loading station. It will be understood that this holds true not only for the somewhat simplified system shown for the sake of clarity in FIG. 4 but also for more complex systems such as in FIG. 1 having various branch lines with a multiplicity of take-off bars and delivery stations for each branch line. Consequently, it is one of the inherent characteristics of the system and one of the important advantages of the invention that once the articles are loaded into the correct entryways at the loading station, they are thereafter always maintained in the desired sorted relation during travel from the loading station to the respective delivery stations. Obviously, there is no chance of error once the articles have been loaded.

Although the invention thus far has been illustrated and described in conjunction with an overhead positive conveyor means for pushing or sliding the hooks along the strips, the principles of the invention are also applicable to an inclined gravity conveying system which may be complete within itself or which may constitute merely a portion of a much larger system. For example, in a conveying-sorting system of the type here involved it may be desirable at one or more points in the system to transport the articles from an upper floor to a lower floor of a building. In such case, the support rail and superimposed strips are disposed at an incline from the upper to the lower level and as the hooks are fed onto the inclined portion of the track they will slide downwardly by gravity to the lower level where they may then be picked up by positive transporting or conveyor means. However, along the gravity operated inclined stretch it is still necessary to provide suitable guide or alignment means for maintaining the superimposed strips in properly stacked relation on the supporting rail. One means for accomplishing this is shown in FIG. 7 wherein an inclined section 56 of support rail with superimposed strips 57 are shown. At spaced intervals along the length of the inclined section are mounted a plurality of swing forks or bifurcated members 58 which extend in straddled relation over the rail 56 and strips 57 for holding the strips in aligned condition in the same general fashion as the combined pusher and guide forks heretofore described. In order to accommodate passage of a hook 28 along the inclined section of the system, each such swing fork 58 is swingably mounted by a U-shaped bracket portion 59 having a pivot pin 59' mounted on a support 60 depending from suitable superstructure indicated fragmentarily at 60'. The swing fork 58 being freely swingable about the axis of the pivot 59, it will be understood that as the hook 28 slides along the track section into contact with the swing fork, the fork will swing upwardly in the manner indicated by the arrows in FIG. 7 so as to permit passage of the hook. Obviously, as soon as the hook 28 has cleared the swing fork 58, the fork will then return automatically by gravity to its normally depending position for retaining the strips 57 in stacked alignment on the rail 56. Although each swing-fork 58 is momentarily displaced during the passage of successive hooks 28, at any one time there will be a sufficient number of forks 58 disposed in depending coacting relation with the strips 57 so that the desired guiding and alignment is always maintained in the inclined section of the system. As mentioned above in connection with conveyor-mounted forks, there is preferably a slight amount of play or clearance between the arms of the bracket 59 and the support 60 so that the fork 58 can undergo limited lateral shifting to facilitate exact alignment thereof with the rail and strips.

The swing forks shown in FIG. 7 for alignment purposes in a gravity system may also be used to provide alignment when separate conveyor means is employed for the hooks such as a conveyor located below the support rail and having pusher elements engaging only the hooks.

Although the swing fork 58 in FIG. 7 has been illustrated in the form of a simple inverted U-shaped member having parallel spaced leg portions, it is contemplated that the swing forks may be provided with the angularly oriented leg portions heretofore shown and described in connection with FIG. 3 so as to realize the additional advantages of this form of fork. In such case it will be understood that the enlarged throat portion or wide opening of the fork must still be located at the leading side of the fork which in the case of the swing fork is the side of the fork which embraces the strips first upon return swinging movement of the fork, i.e. the rearwardmost edges of the fork legs as viewed in FIG. 7.

In FIGS. 8 to 11 I have illustrated a somewhat different embodiment of the invention in which the elongated sorting elements extending between the common loading station and the plurality of delivery stations are in the form of cords or wires rather than strips. In this manner it becomes possible to provide an increased number of trackways or passageways while at the same time keeping the over-all dimensions of the apparatus within practical limits. Instead of merely a superimposed or stacked relation as in the case of strips, the elongated wire elements are arranged in a compact bunch or bundle with the individual wires being disposed both in side-by-side relation and also in superimposed relation. By reason of the substitution of cords or wires for the strips, certain modifications of the apparatus are necessary.

Figures 8, 9, 10, 11:
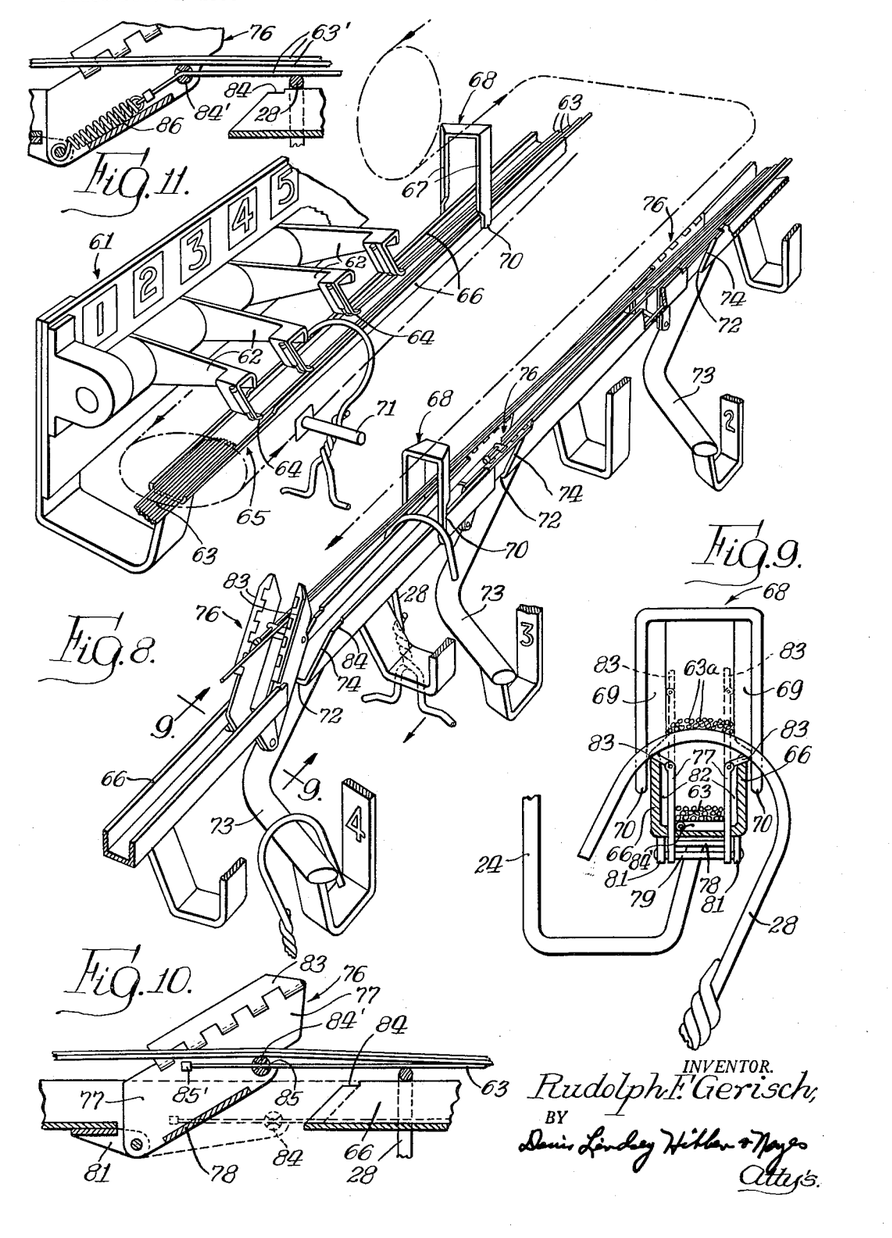
FIG. 8 is a fragmentary perspective view generally similar to FIG. 4 but showing a different embodiment of the invention.
FIG. 9 is an enlarged transverse sectional view substantially as seen along the line 9—9 of FIG. 8.
FIG. 10 is a fragmentary longitudinal view partly in section and showing certain details of the apparatus of FIG. 9.
FIG. 11 is a fragmentary view of a modified form of the detail shown in FIG. 10.

Referring first to FIG. 8, a schematic arrangement generally similar to FIG. 4 is shown including a loading station 61 having a plurality of upwardly swingable sorting arms 62 supported in the same general manner as the arms 43 in FIG. 4. Each arm 62 has rigidly fixed thereto at its outermost end the terminal portion of one of a plurality of wires 63, and the lower edge of each arm is curved or curled, as at 64, to provide a camming action during insertion of a hook. Although it is possible over short straight distances to employ the wires 63 alone without an underlying support provided that the wires are maintained under adequate tension, it is preferred to employ an elongated rigid support below the bunched wires 63. In this case the support is in the form of a channel 65, with side walls or legs 66, and the wires 63 which are secured to the outer ends of the arms 62 are staggered or arranged in side-by-side relation extending across the width of the channel 65. Although, only four such arms 62 are shown in FIG. 8 for the sake of simplicity, it is to be understood that additional arms may be provided so as to utilize successively superimposed layers of wires with the wires in each layer arranged in side-by-side relation. At the loading station 61 the side walls 66 of the channel 65 are preferably provided with a gradually increasing height with the rise being coordinated with each layer of wires 63, as clearly seen in FIG. 8, thereby limiting the sorting arm travel to a minimum during the loading of hooks while retaining the wires within the channel at all times. As in the previous embodiment of the invention, the lifting of any one of the arms 62 during insertion of a hook also effects lifting of all subsequent arms to the right because of the underlying relation of the wires.

The combined pusher and guide forks, designated at 68, which are associated with the conveyor mechanism have a special construction in this instance in order to cooperate with the channel 65 and the wires 63. For the reasons heretofore discussed, the spaced leg portions of the forks 68 are oriented at an angle to each other and to the axis of the channel 65 so that the forward movement of the forks along the channel exerts a camming action for effecting alignment and close bunching of the wires 63 during travel of the forks. Moreover, as best seen in FIG. 8, the angularly disposed legs 69 of the forks 68 are provided with lower end portions 70 of reduced width so that the legs of the forks may clear the side walls 66 of the channel 65 while at the same time the wider upper portions of the fork legs exert a constrictive effect on the bunched wires 63 in the region above the channel side walls 66.

The hooks 28 interposed between adjacent wires 63 are pushed therealong in sliding relation by the forks 68 in the same general manner as heretofore described in connection with the first embodiment of the invention. However, in this case an auxiliary loading conveyor (comprising horizontally disposed pusher pins 71) is utilized to carry the hooks 28 from the various entryways at the loading station 61 to the point where the hooks can be engaged by the overhead conveyor forks 68. As will be apparent particularly from FIG. 9, the hooks 28 ride along and are supported at all times on the upper edges of the channel side walls 66. Consequently, dependent upon the particular part of the wire bundle in which the hook happens to be interposed, certain of the wires designated at 63a in FIG. 9 will be displaced upwardly above the channel walls 66 into the restricted upper slots or spaces of the forks 68 while the remaining wires 63 below the hook 28 will stay within the confines of the channel walls 66. When a hook 28 is being pushed along the loading station by a pusher pin 71, the hook slides upwardly along the rising channel walls and is gradually elevated so that the wires above the hook are likewise gradually displaced upwardly into the restricted upper slot portion of the fork. Although the wires of the bundle thus displaced upwardly are deprived of the guiding and aligning effect of the channel side walls, the upper slot portions of the forks 68 provide the necessary guiding and aligning function. Accordingly, the dimensions of the upper slot portions of the forks 68 must be adequate so that they can temporarily accommodate any portion or, if necessary, all of the wires 63 in the bundle, e.g. when a hook 28 is inserted at entryway "1" of the loading station 61. For the same reasons, the channel 65 must also be large enough to accommodate the entire bundle of wires 63. The upper slot portions of the forks 68 having a restricted width also serve to condense or bunch the upwardly displaced wires so as to facilitate return of the wires into the channel after a hook has passed by.

As shown in FIG. 8, delivery stations are located at spaced intervals along the length of the channel 65 by providing gaps or discontinuities 72 in the channel with a downwardly and outwardly inclined take-off bar 73 being mounted at each such gap 72 for receiving the hooks 28 in the same general manner as the take-off bars 51 in FIG. 4. In FIG. 8, a hook 28 is shown in the process of being pushed along the channel 65 beyond the delivery station "3," and as the hook approaches the next adjacent gap 72 in the channel 65 it will slide downwardly along inclined edges 74 at the end of the channel section and will then be discharged by gravity along the take-off bar 73 at the delivery station "4."

For anchoring the opposite terminal portions of the wires 63, each wire is connected to a swingable channel section or bridge designated generally at 76. The swingable channel section 76 has a pair of side walls 77 interconnected by a bottom web portion 78 with the walls 77 being pivotally secured by a hinge pin 79 to a pair of ears 81 depending from the bottom wall of the main support channel 65. The side walls 77 of the swingable channel 76 are spaced inwardly from the main support channel walls 66, as best seen in FIG. 9, so as to clear the narrow opening between the angularly slanted arms 69 of the pusher forks 68. In order to cover the spaces, designated at 82 in FIG. 9, between the side walls of swingable channel section and the main support channel so as to prevent wires 63 from entering these spaces and becoming jammed, I provide a pair of elongated wings or flanges 83 hingedly secured to the upper edges of the channel section walls 77 for free pivotal movement. In the normal closed position of the channel section 76 wherein the channel section bridges a gap 72 in the main support channel, the hinged wings 83 are received in slots or grooves 84 in the upper edges of the main support channel walls 66 thereby effectively covering over and obstructing the open spaces 82 while at the same time providing a flush edge surface along the main support channel for passage of the hooks 28 therealong.

In addition to the function of the swingable channel sections 76 in providing bridges across the main channel gaps 72, these channel sections also serve as terminal anchor points for the ends of the respective wires 63 in the same general fashion as the pin and slot connection heretofore described in FIG. 6. Thus, each swingable channel section 76 has a cross pin 84' mounted between the side walls 77, and each pin has a single transverse guide hole 85 extending therethrough with the opposite ends of the hole being flared outwardly as seen in FIG. 10. The terminal portion of the appropriate wire 63 extends through the pin opening 85 and is provided with an enlargement 85' at its end extremity to prevent withdrawal of the wire through the hole 85. Thus, it will be seen that the terminal portion of the wire 63 has a loose sliding connection with the swingable channel section 76 which accommodates lifting or deflection of the wire due to passage of a hook and also readily accommodates upward swinging movement of the channel section 76 as seen in FIG. 10. The outwardly flared or somewhat curved ends of the opening 85 facilitate free sliding movement of the wire 63 regardless of the angle of the wire relative to the pin opening 85 as determined by the position of the swingable channel section 76. In the illustrated embodiment in FIGS. 8 to 10 the wires 63, while sufficiently deflectable or bendable to permit passage of the hooks 28 therebetween, are formed from a relatively stiff material on the order of piano wire so that the slidable connection shown in FIG. 10 is feasible.

In FIG. 8, the swingable channel sections 76 at the delivery stations "2" and "3" are shown in normal depressed relation bridging the respective gaps 72 in the channel 65. However, each such swingable channel section 76 is adapted to be automatically lifted or pivoted upwardly about its pivot 79 in order to accommodate and permit drop-off of the hook 28 at one of the gaps 72. Thus, in FIG. 8 the channel section 76 at delivery station "4" is shown in upwardly pivoted relation so as to permit drop-off of the approaching hook 28 onto the take-off bar 73 at the delivery station "4." As will be apparent, the sliding connection of the wire 63 with the cross pin 84' heretofore described readily permits this swinging movement of the channel section 76 to its elongated position and it is an important feature of this particular form of the invention that all of the wires which overlie the pin 84 and are thereby displaced upwardly beyond the confines of the main support channel are at the same time guided and retained by the upwardly and angularly extending spaced side walls 77 of the channel section 76. In FIG. 8, it will be evident that as soon as the approaching hook 28 drops through the gap 72 in the main support channel 65, the lifting effect of the hook will be lost and the channel section 76 will thereupon return by gravity to its normal bridging position. However, before the channel section 76 can return the moving pusher fork 68 begins to register with the still elevated channel section and its outwardly projecting wing portions 83. To avoid obstruction of the fork 68, the angularly slanted ends of the pivoted wings 83 are engaged by the slanted legs 69 and even during elevated position of the channel sections 76 the wings 83 are thereby cammed into upright position, as shown in dotted lines in FIG. 9, so as to pass freely through the fork 68. Once the fork 68 has cleared the channel section 76, the wing portions 83 return by gravity to their normal outwardly extending position so as to bridge the gaps 82 when the channel section 76 has returned to its bridging position.

In FIG. 11 a modified arrangement is shown wherein the wires designated at 63' are flexible wires or cords rather than the somewhat stiffer wires shown in FIGS. 8 to 10. In this case, in order to maintain proper tension in the flexible elements 63' it is necessary to provide a tension spring 86 which interconnects the channel section 76 with the terminal portion of the wire 63' projecting through the apertured cross pin 84'.

As heretofore mentioned, the cross pin 84' in the channel section 76 has only a single hole 85 therethrough since each wire 63 or 63' is connected at its end to only one of the swingable channel sections 76. However, it will be understood that the vertical location of the pin 84' and the horizontal or lateral location of the aperture 85 will be varied for each channel section 76 in order to accommodate the particular location of the corresponding wire in the bundle.

Although in the FIGS. 8-11 embodiment just described the use of a channel-shaped support is shown only in conjunction with elongated wires or cords as the track-defining elements, it is definitely within the scope of my invention to utilize a channel support with the strip elements shown in FIGS. 1-7. Preferably, however, in such case the strips will be comparatively flat and the cross pins 84' in the swingable channel section 76 will be provided with slots to accommodate the end portions of the flat strips. An important advantage in the use of a channel support even with strips is that the weight of the hooks is at all times borne by the side walls of the channel thereby minimizing wear on the strips.

In FIG. 12 I have illustrated a modification of the pusher fork 68 in that the narrow or restricted trailing edges of the fork arms 69 are provided with elongated, vertically disposed, freely rotatable roller elements 88 in order to minimize the frictional resistance upon contact with the bunched wires 63a contained within the upper slot portion of the fork. Obviously, such friction-reducing rollers may also be used in connection with forks of the type shown in FIGS. 3, 4, 5, and 7.

Figures 13, 14, 15, 16, 17, 18:
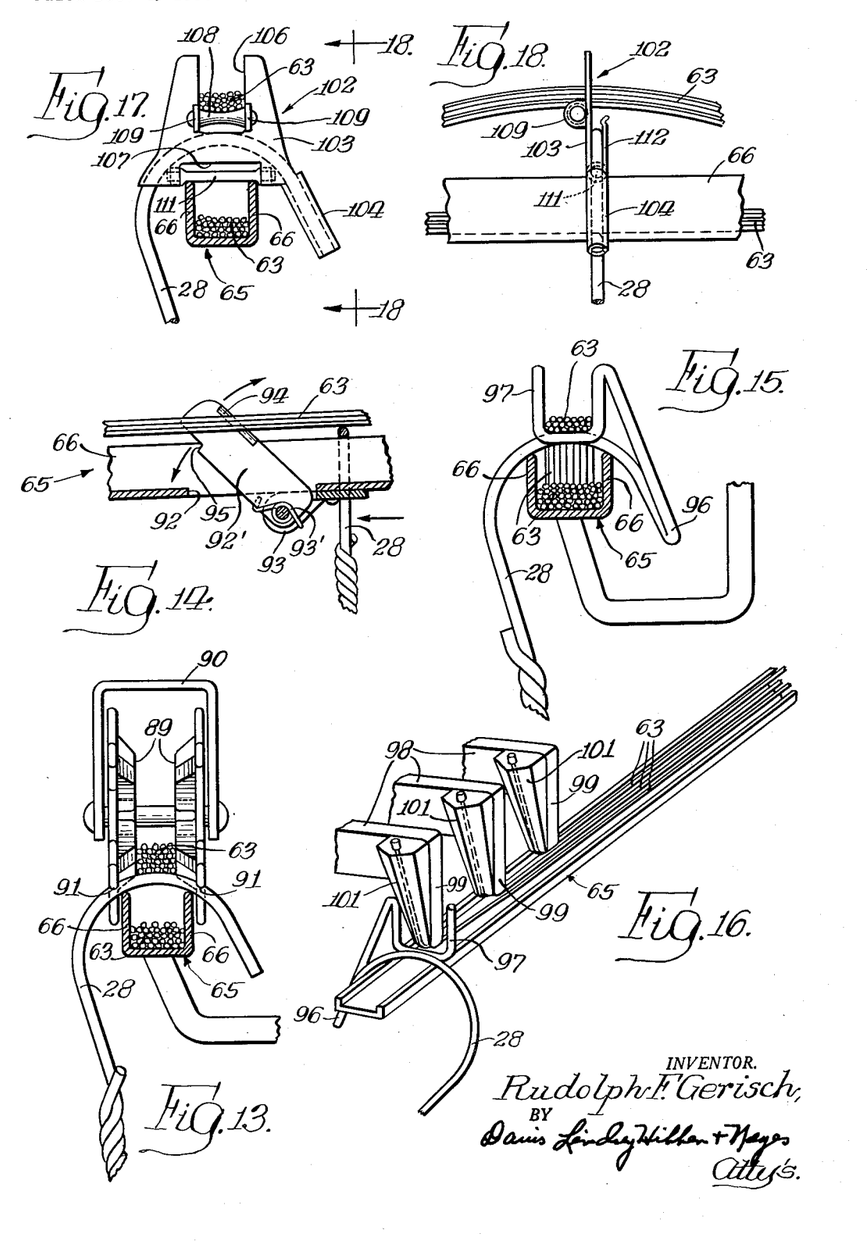
FIG. 18 is a side elevational view as seen along the line 18—18 of FIG. 17.

In FIG. 13 is illustrated one form of wire guiding or aligning device for use independently of the conveyor means, such as in an inclined section of the system where the hooks 28 slide by gravity rather than being positively pushed or in a conveyor arrangement located below the channel support. Thus, the device shown in FIG. 13 serves the same general purpose as the swing forks 58 heretofore discussed in connection with FIG. 7. The guide means of FIG. 13 comprises a pair of radially slotted flange elements 89 mounted in axially spaced relation for rotation in a supporting bracket 90. The bracket 90 is rigidly affixed to a superstructure (not shown) so that the radially slotted flanges 89 are disposed above the inclined channel 65. As the hook 28 passes along the channel 65 it will be received within one of the sets of radial slots, designated at 91, in the flanges 89 and the latter will thereupon revolve freely to permit passage of the hook 28 therethrough. The flanges 89 have relatively thickened hub portions so as to provide a restricted space therebetween for condensing or bunching the wires 63 and thereby facilitating return of the wires from their upwardly displaced position back into the channel 66 after the hook 28 has passed through the device. Thus, the wires 63 which are displaced above the channel 65 by reason of the passage of the hook 28 are effectively guided and aligned without interfering with sliding passage of the hook 28 therealong.

In FIG. 14 I have illustrated still another type of wire guiding or aligning device which can be used independently of the conveyor means as an alternative to the swing fork structure shown in FIG. 7 or the wheel arrangement just described in connection with FIG. 13. In this case, the main support channel 65 has a cut out section or slot 92 in the base of the channel to accommodate a U-shaped swingable channel section or fork having a pair of spaced side arms 92' pivotally secured to a pair of ears 93 depending from the base of the main support channel. A spring element 93' coacts with the ears 93 and the arms 92' for yieldably holding the arms 92' in elevated position as shown in FIG. 14. It will be understood that FIG. 14 is a longitudinal sectional view through the center of the channel 65 so that only one of the side arms 92' of the swingable channel section is shown adjacent one of the side walls 66 of the main support channel. In this upwardly pivoted position of the arms 92' the upwardly displaced wire or cord elements 63 are effectively retained and guided. As a hook 28 approaches the swingable channel section and engages the same, the force of the moving hook 28 depresses the swingable channel section against the action of the spring 93' so that the arms 92' are received in flush relation within the channel 65 to permit passage of the hook 28. For limiting movement of the swingable channel section and accurately positioning the same, each arm 92' has an outwardly extending integral flange portion 94 which is received within and abuts against a complementary notch (not shown) cut out of the upper edge of one of the channel walls 66. Also, a notch 95 is provided in the lower outer corner of each arm 92' so as to engage the base of the channel 65 adjacent the slot 92 while at the same time insuring a flush relationship at the top edges of the main channel so as not to obstruct passage of the hook 28. Once the hook 28 has passed over the depressed channel section, the spring 93' causes the channel section to return automatically to its upwardly elevated position as shown in FIG. 14 so that it can resume its guiding and aligning function for upwardly displaced wires 63 upon the next subsequent passage of a hook.

In FIG. 15 a special type of hook is shown having a configuration such that the hook itself functions as a guide for the wires so as to supplement or substitute for the use of aligning forks. Thus, the hook portion 28 of a conventional hanger is provided with an extension including a reverse bend portion 96 and a terminal U-shaped portion 97, the latter being disposed above the normal hook portion of the hanger. When a special hook of this configuration is employed, it will be seen that the upwardly displaced group of wires 63 are retained within and guided by the U-shaped terminal portion 97 of the hook. The width of the U-shaped portion 97 is restricted relative to the width of the channel 65 so as to facilitate re-entry of the upwardly displaced wires into the channel as the hook moves along. Obviously, the use of such a special hook configuration requires certain modifications at the loading station in order to permit proper loading of the hooks. In FIG. 16 I have shown a variation in the sorting arm structure to accommodate the hook configuration shown in FIG. 15.

In this case, each sorting arm indicated at 98 has a downturned outermost end portion 99 of relatively narrow dimensions so as to pass through the upper U-shaped guide portion 97 of the special hook. A tapered cam block 101 is secured at one side of each downturned end 99 to facilitate alignment and passage of the hook portions 97. As before, the terminal portions of the wires 63 are rigidly fastened to the outer ends of the sorting arms, in this case to the cam blocks 101. As seen in FIG. 16, when one of these special hooks is loaded at an entryway in the usual manner it can then be slid along the channel 65 between the selected wires or groups of wires 63, and the end structures 99—101 of the sorting arms are narrow enough to permit the U-shaped portions 97 of the hooks to pass thereover with the tapered cam surfaces of the blocks 101 correcting for any initial misalignment.

FIGS. 17 and 18 illustrate still another modification in the form of a special clip-on attachment for a conventional hook 28. The attachment designated generally at 102 is in the form of an upright plate element 103 mounted at the upper curved portion of the hook 28 and retained thereon by a rolled tubular extension 104 having a tight frictional fit over the end portion of the hook 28. The plate 103 is provided with a pair of opposed slots or notches 106 and 107 extending inwardly from the upper and lower edges of the plate element 103, respectively. The notch 106 is of relatively great depth and is fitted with a roller 108 journaled between a pair of ears 109 at the base of the notch. The upwardly displaced wires 63 are received within the notch 106 in engagement with the underlying roller 108. Another roller 111 extends across the lower notch 107 and is rotatably retained by upwardly bent resilient portions 112 of the plate 103. The roller 111 is adapted to engage the upper edges of the side walls 66 of the channel 65. Consequently, by means of the rollers 108 and 111 frictional resistance to sliding movement of the hooks 28 is greatly diminished both with respect to the channel edges and also with respect to the upwardly displaced wires 63.

The special hook configuration of FIG. 15 and the attachment of FIGS. 17–18 are particularly suitable for a system or system section in which wires under substantial tension are employed without an underlying channel or rigid support. Also, these hook structures are likewise usable in a system employing strips such as described in connection with the first embodiment of the invention.

Although the invention has been described with particular reference to certain specific structural embodiments thereof, it is to be understood that various modifications and equivalents may be resorted to without departing from the scope of the invention as defined in the appended claims.

I claim:

1. A combined conveying and sorting apparatus for articles suspended from hooks or the like, comprising a plurality of elongated relatively deflectable elements grouped together in contiguous, generally parallel relation and extending between a common loading station at one end of said elements and a plurality of individual delivery stations at the opposite ends of the respective elements, said elements being adapted to be spread apart locally by hooks interposed between adjacent elements for sliding movement therealong in predetermined sorted relation from the loading station to said delivery stations, and guide means movable relative to said elements and coacting with said elements for retaining the same in closely grouped, contiguous relation during sliding movement of the hooks along said elements.

2. A combined conveying and sorting apparatus for articles suspended from hooks or the like, comprising a plurality of elongated relatively deflectable elements grouped together in contiguous, generally parallel relation and extending between a common loading station at one end of said elements and a plurality of individual delivery stations at the opposite ends of the respective elements, said elements being adapted to be spread apart locally by hooks interposed between selected adjacent elements for sliding movement therealong, receiving means at each of said delivery stations cooperating with the individual elements for receiving therefrom groups of hooks in predetermined sorted relation as determined by the loading at said loading station, and guide means movable relative to said elements and having spaced portions disposed closely adjacent the grouped elements at opposite sides thereof and coacting with said elements at spaced intervals therealong between said loading station and said delivery stations for retaining said elements in closely grouped, contiguous relation during said sliding movement.

3. The apparatus of claim 2 further characterized in that said spaced portions of said guide means are provided with roller means for minimizing friction during aligning engagement with said elements.

4. The apparatus of claim 2 further characterized in that said guide means comprises a plurality of bifurcated members disposed at spaced intervals along said elements.

5. A combined conveying and sorting apparatus for articles suspended from hooks or the like, comprising a plurality of elongated relatively deflectable elements grouped together in contiguous, generally parallel relation and extending between a common loading station at one end of said elements and a plurality of individual delivery stations at the opposite ends of the respective elements, said elements being adapted to be spread apart locally by hooks interposed between adjacent elements for sliding movement therealong in predetermined sorted relation from the loading station to said delivery stations, and moving conveyor means disposed adjacent said elements and including a plurality of combined pusher and guide members movable relative to said elements and spaced along the length of said elements and adapted to engage the hooks for forcibly sliding the same along said elements, said members having laterally spaced guide portions extending along the opposite sides of the grouped elements for maintaining the latter in closely grouped alignment.

6. The apparatus of claim 5 further characterized in that said members comprise generally U-shaped fork members each having a pair of spaced leg portions, said fork members being supported in inverted relation by the conveyor means above said elements for movement therealong by the conveyor means, and said leg portions extending downwardly closely adjacent the grouped elements at opposite sides thereof for aligning coaction therewith.

7. A combined conveying and sorting apparatus for articles suspended from hooks or the like, comprising track means including a plurality of elongated relatively deflectable elements grouped together in contiguous generally parallel relation, said elements being adapted to be spread apart locally by hooks, interposed between adjacent elements for sliding movement along said track means with the hooks being maintained in predetermined sorted relation during said movement, and aligning means for said elements comprising a plurality of bifurcated members swingably mounted in inverted relation above said track means at spaced intervals therealong, each of said members having a pair of depending spaced leg portions disposed closely adjacent the grouped elements at opposite sides thereof and coacting therewith for retaining the elements in closely grouped relation, and said members being swingable to permit passage of the hooks along the track means.

8. A combined conveying and sorting apparatus for articles suspended from hooks or the like, comprising a plurality of elongated relatively deflectable elements grouped closely together in generally parallel relation and extending between a common loading station at one end of said elements and a plurality of individual delivery stations at the opposite ends of the respective elements, said elements being adapted to be spread apart locally by hooks interposed between adjacent elements for sliding movement therealong in predetermined sorted relation from the loading station to said delivery stations, and movable guide means comprising a plurality of bifurcated members movably supported above said elements and adapted to move into straddled relation with the grouped elements at spaced intervals therealong, each of said bifurcated members having angularly disposed portions in spaced relation at opposite sides of said elements and providing a relatively enlarged clearance between the edges of said portions at one side of the bifurcated member and a relatively restricted clearance between the edges of said portions at the opposite side of the bifurcated member whereby during movement of the bifurcated member into straddled relation with said elements the enlarged clearance portion of said bifurcated member is adapted to embrace the grouped elements first and whereby the angularly disposed portions exert a camming action for correcting misalignment of the elements.

9. A combined conveying and sorting apparatus for articles suspended from hooks or the like, comprising a plurality of elongated relatively deflectable elements grouped closely together in generally parallel relation and extending between a common loading station at one end of said elements and a plurality of individual delivery stations at the opposite ends of the respective elements, said elements being adapted to be spread apart locally by hooks interposed between adjacent elements for sliding movement therealong in predetermined sorted relation from the loading station to said delivery stations, conveyor means for effecting sliding movement of the hooks along said elements including a plurality of bifurcated pusher and guide members spaced along the lengths of said elements and means for continuously bringing said members into contact with the hooks in straddled relation with said elements for sliding the hooks therealong and subsequently disengaging the respective bifurcated members from the hooks and returning the same for repeated reengagement with successive hooks, each of said bifurcated members having angularly disposed portions in spaced relation at opposite sides of said elements and providing a relatively enlarged clearance between the edges of said portions at one side of the bifurcated member and a relatively restricted clearance between the edges of said portions at the opposite side of the bifurcated member whereby during movement of the bifurcated member into straddled relation with said elements the enlarged clearance portion of said bifurcated member is adapted to embrace the grouped elements first and whereby the angularly disposed portions exert a camming action for correcting misalignment of the elements.

10. A combined conveying and sorting apparatus for articles suspended from hooks or the like, comprising an elongated substantially rigid support, a plurality of superimposed elongated relatively deflectable strips extending along and mounted on said support, said strips having a generally arched transverse contour whereby to facilitate nesting of the strips in closely aligned, contiguous, superimposed relation above said support, the nested strips extending along said support in generally parallel relation between a common loading station at one end of said strips and a plurality of individual delivery stations at the opposite ends of the respective strips, said strips being adapted to be spread apart locally by hooks interposed between adjacent strips for sliding movement therealong in predetermined sorted relation from the loading station to said delivery stations, and movable guide means having spaced portions coacting with the opposite longitudinal edges of said strips for retaining the latter in nested relation during said sliding movement.

11. A combined conveying and sorting apparatus for articles suspended from hooks or the like, comprising elongated substantially rigid support means including a main run portion and a plurality of intermediate laterally diverging portions with a gap in the main run portion at each diverging portion, a plurality of elongated relatively deflectable elements extending along and mounted on said support means in closely grouped generally parallel relation, a common loading station at one end of said support means having means for slidingly receiving individual hooks in interposed relation between selected adjacent elements whereby the hooks are adapted to be slid along said elements to individual delivery stations corresponding to different groups into which the articles are to be sorted, the gap at each diverging portion of said support means permitting drop-off of selected hooks onto the corresponding diverging portion, and means bridging each of said gaps for providing continuous sliding passage of other hooks along the support means beyond each diverging portion.

12. The apparatus of claim 11 further characterized in that said elements comprise a plurality of superimposed strips disposed on said support means, and the bridging means at each of said gaps comprises a continuation of at least one of said strips over the gap.

13. A combined conveying and sorting apparatus for articles suspended from hooks or the like, comprising an elongated substantially rigid support having a plurality of intermediate laterally diverging portions with a gap in the support at each diverging portion, a plurality of elongated relatively deflectable elements extending along and mounted on said support in closely grouped generally parallel relation, a common loading station at one end of said support having means for slidingly receiving individual hooks in interposed relation between selected adjacent elements whereby the hooks are adapted to be slid along said elements to individual delivery stations corresponding to different groups into which the articles are to be sorted, each of said elements having a fixed connection at one end thereof with the loading station and extending continuously from the loading station to a relatively loose terminal connection at its opposite end with said support at a point along the support adjacent one of said gaps whereby to permit selective drop-off of hooks through the gaps onto the respective diverging portions, and means bridging said gaps for providing continuous sliding passage of hooks along the support beyond each diverging portion, said relatively loose terminal connection permitting limited movement of said opposite end of each element relative to the support for accommodating expansion and contraction of the elements and facilitating drop-off of hooks through the gaps.

14. The apparatus of claim 13 further characterized in that said elements comprise a plurality of superimposed strips disposed on said support, and said terminal connection comprises a slot in the support and a pin connected to the strip end and extending loosely through the slot.

15. A combined conveying and sorting apparatus for articles suspended from hooks or the like, comprising a plurality of elongated relatively deflectable elements grouped together in contiguous, generally parallel relation and extending between a common loading station at one end of said elements and a plurality of individual delivery stations at the opposite ends of the respective elements, said elements being adapted to be spread apart locally by hooks interposed between adjacent elements for sliding movement therealong in predetermined sorted relation from the loading station to said delivery stations, guide means movable relative to said elements and having spaced portions disposed closely adjacent the grouped elements at opposite sides thereof and coacting with said elements along the length thereof for retaining the same in closely grouped, contiguous relation, and means at said loading station defining a plurality of entryways between terminal end portions of adjacent elements, said entryways being spaced longitudinally of said elements and being adapted to receive hooks preparatory to movement of the hooks along said elements in predetermined sorted relation corresponding to the choice of entryways at said loading station.

16. A combined conveying and sorting apparatus for articles suspended from hooks or the like, comprising a plurality of elongated relatively deflectable elements grouped together in contiguous, generally parallel relation and extending between a common loading station at one end of said elements and a plurality of individual delivery stations at the opposite ends of the respective elements, said elements being adapted to be spread apart locally by hooks interposed between adjacent elements for sliding movement in predetermined sorted relation therealong from the loading station to said delivery stations, guide means coacting with said elements along the length thereof for retaining the same in closely grouped, contiguous relation, receiving means at said loading station defining a plurality of entryways for admitting hooks between adjacent elements in predetermined sorted relation, said receiving means including a plurality of fastening members spaced longitudinally of said elements and each having secured thereto one terminal end portion of an individual element, and a take-off bar at each of said delivery stations disposed at the opposite terminal end portion of an individual element whereby each of said elements extends continuously and uninterruptedly between one of said fastening members at the loading station and a take-off bar at a delivery station thereby maintaining the hooks in said predetermined sorted relation during movement of the hooks from the loading station to the delivery stations.

17. A combined conveying and sorting apparatus for articles suspended from hooks or the like, comprising a plurality of elongated relatively deflectable elements grouped closely together in generally parallel relation and extending between a common loading station at one end of said elements and a plurality of individual delivery stations at the opposite ends of the respective elements, said elements being adapted to be spread apart locally by hooks interposed between adjacent elements for sliding movement in predetermined sorted relation therealong from the loading station to said delivery stations, guide means coacting with said elements along the length thereof for retaining the same in closely grouped relation, a plurality of movable sorting arms at said loading station each connected to a terminal end portion of one of said elements, said arms being arranged in spaced relation longitudinally of said elements to provide entryways between adjacent elements adapted to receive hooks preparatory to movement of the hooks along said elements in predetermined sorted relation corresponding to the choice of entryways at the loading station, and means pivotally supporting said arms at said loading station for swinging movement whereby each arm is liftable to facilitate forcible insertion of a hook between adjacent elements at one of said entryways.

18. The apparatus of claim 17 further characterized in that said arms are disposed in side-by-side substantially parallel and laterally spaced relation with a pivot shaft swingably mounting each arm at one end thereof and with the opposite end of each arm being secured to a terminal end portion of an individual element.

19. A combined conveying and sorting apparatus for articles suspended from hooks or the like, comprising elongated rigid channel means having a base and upright spaced side walls, a plurality of elongated relatively deflectable elements extending within said channel means in closely grouped, contiguous generally parallel relation, a common loading station at one end of said channel means having means for admitting individual hooks for sliding movement in interposed relation between selected elements corresponding to the different groups into which the articles are to be sorted, a plurality of delivery stations along said channel means remote from said loading station and having means for receiving hooks from individual elements in predetermined sorted relation as determined by the loading at said loading station, each of said elements extending continuously between said loading station and one of said delivery stations, said upright side walls of said channel means supporting the hooks during sliding movement of the hooks from said loading station to said delivery stations and at least a portion of said elements being thereby displaced upwardly above said walls beyond the confines of said channel means by the hooks interposed in the grouped elements, and guide means coacting with said elements at spaced points along the length thereof for retaining the upwardly displaced elements in closely grouped, contiguous relation during said sliding movement.

20. The apparatus of claim 19 further characterized in that said elements comprise wires.

21. The apparatus of claim 19 further characterized in that said guide means comprises a plurality of bifurcated pusher and guide members arranged for movement along said channel means for pushing hooks in sliding relation therealong, each of said bifurcated members having a pair of legs depending in spaced relation at opposite sides of said channel means adjacent the side walls thereof, the lower portions of said legs being of reduced width to clear said walls and engage the hooks, and the upper portions of said legs being of greater width so as to extend inwardly of said walls whereby to provide a restricting and aligning action on the displaced elements above the hooks.

22. The apparatus of claim 19 further characterized in that said guide means comprises axially spaced flange members rotatably supported above the channel means and having radial slots therein adapted to receive a hook and to rotate for allowing passage of the hook along the channel means, said flange members coacting with the upwardly displaced elements for retaining the same in closely grouped relation during said passage.

23. The apparatus of claim 19 further characterized in that said guide means comprises spaced arms pivotally mounted adjacent the base of the channel means, and spring means yieldably urging said arms into elevated position above the side walls of the channel means for embracing the upwardly displaced elements, said arms being temporarily depressible within the channel means against the action of said spring means for permitting passage of a hook.

24. A combined conveying and sorting apparatus for articles suspended from hooks or the like, comprising elongated rigid channel means having a base and upright spaced side walls, a plurality of elongated relatively deflectable elements extending within said channel means in closely grouped generally parallel relation, a common loading station at one end of said channel means having one end of each of said elements secured thereat and having means for admitting individual hooks for sliding movement in interposed relation between selected elements corresponding to the different groups into which the articles are to be sorted, a plurality of delivery stations along said channel means remote from said loading station and having means for receiving hooks from individual elements in predetermined sorted relation as determined by the loading at said loading station, said channel means having a gap at each delivery station for discharging hooks to the delivery station, a plurality of anchor members swingably mounted in said channel means at said gaps with each anchor member having the opposite end of one of said elements connected thereto, said anchor members being normally disposed in bridging relation across said gaps to accommodate the passage of certain hooks thereover but being swingable upwardly to permit discharge of other hooks through the respective gaps to the delivery stations, the upper edges of said upright side walls of said channel means supporting the hooks during sliding movement of the hooks from said loading station to said delivery stations and at least a portion of said elements being thereby displaced upwardly above said walls beyond the confines of said channel means by the hooks interposed in the grouped elements, and guide means coacting with said elements at spaced points along the length thereof for retaining the upwardly displaced elements in closely grouped relation during said sliding movement.

25. The apparatus of claim 24 further characterized in that said anchor elements comprise channel sections pivotally secured adjacent the base of said channel means at said gaps, each channel section having spaced walls adjacent to and spaced inwardly from the side walls of said channel means with said elements being connected to the respective channel sections intermediate the spaced walls thereof.

26. The apparatus of claim 25 further characterized in that each channel section is provided with hinged elements at the upper edges of the spaced walls thereof, said hinged elements normally extending outwardly to cover the spaces between the walls of the channel section and the adjacent walls of the channel means when the channel sections are in bridging position across the gaps, said guide means comprising bifurcated moving pusher members having portions extending at each side of said channel means for engaging and pushing the hooks and simultaneously guiding the upwardly displaced elements above said hooks, and said hinged elements on said channel sections being swingable upwardly upon being engaged by the moving pusher members so as to permit passage of the pusher members past said channel sections.

27. The apparatus of claim 25 further characterized in that the connection between said channel section and said element comprises a cross pin extending between the walls of the channel section and a transverse aperture in said pin having the end portion of the element extending loosely therethrough in slidable relation for permitting limited relative movement between the element and the channel section.

28. The apparatus of claim 27 further characterized in that the end portion of said element extending loosely through the aperture in the cross pin has a resilient connection with the channel section for maintaining tension in the element.

29. A conveying and sorting system comprising in combination a plurality of elongated relatively deflectable elements grouped closely together in generally parallel relation and extending between a common loading station at one end of said elements and a plurality of individual delivery stations at the opposite ends of the respective elements, a plurality of hook members for suspending articles and adapted to be interposed between adjacent elements for sliding movement therealong in predetermined sorted relation from the loading station to said delivery stations, and generally U-shaped guide means extending upwardly from said hook members and receiving the elements located above the interposed hook members for retaining the same in closely grouped relation during sliding movement of the hook members along said elements.

30. The system of claim 29 further characterized in that the hook member comprises a downturned portion having an integral extension including a reverse bend portion and a terminal U-shaped guide portion disposed generally above said downturned portion.

31. The system of claim 29 further characterized in that said guide means comprises a generally U-shaped structure detachably mounted on said hook member and having roller means disposed above and below the hook member for facilitating sliding movement of the interposed hook member along said elements.

32. A hanger for use with a combined conveying and sorting system having a plurality of elongated relatively deflectable elements grouped closely together in generally parallel relation and extending between a loading station and a plurality of delivery stations, said hanger comprising a downturned hook portion adapted to be interposed between adjacent elements for sliding movement therealong, a reverse bend portion extending integrally from the end of the downturned hook portion, and a terminal U-shaped guide portion integrally connected to said reverse bend portion and disposed generally above said downturned hook portion, said guide portion being adapted to receive the elements located above the interposed hook portion for retaining the same in closely grouped relation during sliding movement of the hook portion along the elements.

33. An attachment for a hook member adapted for use in a combined conveying and sorting system having a plurality of elongated relatively deflectable elements grouped closely together in generally parallel relation and extending between a loading station and a plurality of delivery stations, said attachment comprising a generally U-shaped structure having means for frictionally mounting the same on the hook member in upwardly extending relation, and a pair of rollers rotatably supported on said structure so as to be disposed above and below the hook member when the attachment is mounted thereon, said rollers being adapted to facilitate sliding movement of the hook member along the elements when interposed in the group of elements.

34. A combined conveying and sorting apparatus for articles suspended from hooks or the like, comprising elongated substantially rigid support means, a plurality of elongated relatively deflectable elements extending along and mounted on said support means in closely grouped contiguous relation, a common loading station at one end of said support means for admitting individual hooks for sliding movement in interposed relation between selected elements corresponding to the different groups in which the articles are to be sorted, a plurality of delivery stations spaced along said support means remote from said loading station and having means for receiving hooks from the ends of said elements in predetermined sorted relation, and guide means movable relative to said elements and having spaced portions disposed closely adjacent the grouped elements at opposite sides thereof and coacting with said elements for retaining the same in closely grouped contiguous relation.

35. The apparatus of claim 34 further characterized in that said support means includes a main run portion and a plurality of diverging branches with at least certain of said elements extending along and mounted on said branches.

36. A combined conveying and sorting apparatus for articles suspended from hooks or the like, comprising elongated substantially rigid support means, a plurality of elongated relatively deflectable elements extending along and mounted on said support means in closely grouped contiguous relation, a common loading station at one end of said support means for admitting individual hooks for sliding movement in interposed relation between selected elements corresponding to the different groups into which the articles are to be sorted, a plurality of delivery stations spaced along said support means remote from said loading station and having means for receiving hooks from the ends of said elements in predetermined sorted relation, and guide means coacting with said elements for retaining the same in closely grouped contiguous relation, said guide means comprising a pair of spaced arms pivotally mounted on said support means and spring means yieldably urging said arms into elevated position at opposite sides of the grouped elements for maintaining the latter in closely grouped alignment, said arms being temporarily depressible against the action of said spring means for permitting passage of a hook.

References Cited in the file of this patent

UNITED STATES PATENTS

| | | |
|---|---|---|
| 1,442,441 | Pugh | Jan. 16, 1923 |
| 1,484,137 | La Boiteaux | Feb. 19, 1924 |
| 1,499,641 | Cox | July 1, 1924 |
| 1,775,545 | Anderson | Sept. 9, 1930 |
| 1,954,124 | Frost et al. | Apr. 10, 1934 |
| 2,124,444 | Boumans et al. | July 19, 1938 |